UNITED STATES PATENT OFFICE.

JOHN L. THOMSON, OF BAYONNE, NEW JERSEY, ASSIGNOR TO THE ORFORD COPPER COMPANY, OF NEW JERSEY.

METHOD OF PRODUCING AND SEPARATING SULPHIDE OF NICKEL.

SPECIFICATION forming part of Letters Patent No. 489,882, dated January 10, 1893.

Application filed March 22, 1892. Serial No. 425,978. (No specimens.)

*To all whom it may concern:*

Be it known that I, JOHN L. THOMSON, a subject of the Queen of Great Britain, and a resident of Bayonne, in the county of Hudson and State of New Jersey, have invented a certain new and useful Improvement in Methods of Producing and Separating Sulphide of Nickel in the Treatment of Ores and Mattes Containing Nickel, of which the following is a specification.

My invention relates to an improvement in method or process for obtaining and separating commercially pure sulphide of nickel in the treatment of mattes containing copper, nickel, iron and other metals as the same results from the various operations of smelting various classes of ores containing these metals for use in metallurgical operations; and it also relates to an improvement in methods of utilizing the by-products resulting from one separation or other separations, and more particularly to a method or process in which the separation of the sulphide of nickel is effected by the addition of a sulphide of any one of the alkaline metals or ammonium, but preferably sulphide of soda, which produces, after smelting, a very fluid mass in which the various metals or salts therein contained are so chemically changed, that they assume during the smelting or upon cooling, by reason of their varying specific gravity, such relative positions with reference to each other that they may be readily separated by mechanical means or by hand.

Now, I have discovered that where copper, iron, nickel and sulphur are combined as sulphides in an ordinary matte produced from or by the primary treatment of the ores of these metals, in the ordinary operation of smelting in any convenient form of furnace, or in the form of ores of these metals, they exist probably as a combined molecule, the affinity of the various metals for the sulphur is different and the metals exist in the mattes as subsulphides. When the mattes are treated with any sulphide of the alkaline metal or ammonium, the copper first, then the iron, and lastly the nickel tend to take sulphur from the alkaline sulphide. When, for example, sulphide of soda is used, the sulphides of these metals coalesce with the soda and form a very fluid mass. The sulphides of iron and copper adhere to the soda salts that are formed, and rise to the top of the mass in the same manner as slag rises upon metal while the nickeliferous products are precipitated to the bottom, and in the bottom of the mass the same sulphides of copper and iron are found in a certain quantity, and a much larger proportion of the nickel than of the other metals, in the form of a sulphide of some sort. The smelted product so formed, so far as it consists of crude metallic nickel, if any there be, and sulphide of nickel will be of greater specific gravity than the other portions of the mass, this separation being effected in the furnace itself; and upon allowing the same to cool, the nickeliferous products being found upon the bottom, may be readily separated therefrom, either by breaking up the mass on becoming cool, or drawing off the upper portion of the mass while still molten.

In practice, when the smelted mass is tapped from the furnace and allowed to cool in an ordinary cooling bed, or in any mold or slag pot, two distinct compounds exist which will assume with reference to each other, the relative position of layers or strata, and which I call "tops" and "bottoms," according to their position. The "tops" so-called, consist of salts of soda, sulphide of copper and iron, and some sulphide of iron and nickel, while the "bottoms" consist of a very small amount of soda, copper and iron, in the form of sulphides, and the greater part of the nickel in the form of a sulphide of nickel; the proportion of the latter being very largely in excess of the proportion of the iron and copper, for the reasons above given. If now the so-called "bottoms" resultant from this operation or step in the separation, are subjected to further treatment by again smelting or melting in any shaft or suitable furnace, with the sulphides, of any alkaline metal or ammonium still further separation of the copper and iron from the nickel can be effected, and eventually a sulphide of nickel produced which is commercially pure. The operation may thus be repeated any number of times according to the character of the ores or mattes to be treated, and according to the purity desired in the sulphide of nickel. The smelting may take place in any convenient form of furnace, and the separation of the mass, after smelting and settling, may be effected in any convenient manner. In theory any sulphide of any alkaline metal or ammonium may be used, but in practice it will be found preferable to use sulphide of soda, as it is much more cheaply and readily procured than other sulphides of the character mentioned. The sulphide of nickel so produced may be sold as such, for use in subsequent metallurgical operations, or it may be desulphurized and converted into oxide of nickel and sold in that form, or it may be converted into metallic nickel in any convenient manner, as may be desired.

I claim as my invention:

1. The hereinbefore described method of producing and separating sulphide of nickel, consisting in smelting ores or mattes containing nickel with a sulphide of any of the alkaline metals or ammonium, substantially as described, whereby sulphide of nickel is formed, which is of greater specific gravity than the remainder of the mass, and is precipitated to the bottom of the mass, while the copper, iron, and salts of soda, rise to the top and may be separated in any convenient manner.

2. The hereinbefore described method of producing sulphide of nickel consisting in smelting the ores, mattes or other substances containing nickel with a sulphide of any of the alkaline metals or ammonium, substantially as described, in separating out the sulphide of nickel resultant from the operation, from the smelted mass, and in re-smelting the bottoms rich in sulphide of nickel with the alkaline sulphide and separating the resultant sulphide of nickel from the sulphides of the other metals present and in repeating the operation until a commercially pure residue of sulphide of nickel is obtained.

3. The hereinbefore described method of producing and separating sulphide of nickel consisting in smelting the ores, mattes or other bodies containing nickel, with a sulphide of any of the alkaline metals or ammonium, substantially as described, in separating out the bottoms rich in sulphide of nickel resultant from the smelting, by means of specific gravity, and in subjecting the separate sulphide of nickel to repeated smelting with the sulphides of any of the alkaline metals, and subsequent separation by specific gravity until a commercially pure residue of sulphide of nickel is obtained.

In testimony that I claim the foregoing as my invention I have signed my name, in presence of two witnesses, this 18th day of March, 1892.

JOHN L. THOMSON.

Witnesses:
EDWIN T. RICE, Jr.,
WILLARD PARKER BUTLER.